United States Patent
Fisker (10) Patent No.: US 12,251,285 B2
(45) Date of Patent: Mar. 18, 2025

(54) SYSTEM AND METHOD FOR FABRICATING A DENTAL TRAY

(71) Applicant: 3SHAPE A/S, Copenhagen (DK)

(72) Inventor: Rune Fisker, Virum (DK)

(73) Assignee: 3SHAPE A/S, Copenhagen (DK)

( * ) Notice: Subject to any disclaimer, the term of this patent is extended or adjusted under 35 U.S.C. 154(b) by 361 days.

(21) Appl. No.: 17/794,389

(22) PCT Filed: Jan. 22, 2021

(86) PCT No.: PCT/EP2021/051483
§ 371 (c)(1),
(2) Date: Jul. 21, 2022

(87) PCT Pub. No.: WO2021/148622
PCT Pub. Date: Jul. 29, 2021

(65) Prior Publication Data
US 2023/0049287 A1    Feb. 16, 2023

(30) Foreign Application Priority Data
Jan. 23, 2020   (DK) .............................. 2020 70047

(51) Int. Cl.
*A61C 19/06*     (2006.01)
*G06T 7/12*      (2017.01)

(52) U.S. Cl.
CPC .............. *A61C 19/066* (2013.01); *G06T 7/12* (2017.01); *G06T 2207/30036* (2013.01)

(58) Field of Classification Search
None
See application file for complete search history.

(56) References Cited

U.S. PATENT DOCUMENTS 6,142,780 A    11/2000   Burgio
10,105,196 B2 *  10/2018  Fisker .................. A61C 8/0048
(Continued)

FOREIGN PATENT DOCUMENTS

WO    0044303 A1     8/2000
WO    2020249583 A1  12/2020

OTHER PUBLICATIONS

International Search Report (PCT/ISA/210) and Written Opinion (PCT/ISA/237) mailed on Mar. 12, 2021, by the European Patent Office as the International Searching Authority for International Application No. PCT/EP2021/051483. (11 pages).

(Continued)

*Primary Examiner* — Anand P Bhatnagar
(74) *Attorney, Agent, or Firm* — Buchanan Ingersoll & Rooney (57) ABSTRACT

According to an embodiment, a method for generating a digital data set for fabricating a physical dental bleaching tray useable to deliver an bleaching agent is disclosed. The method includes obtaining a three-dimensional digital representation of a patient's dentition including teeth and gingiva; segmenting two or more teeth into individual tooth; identifying a facial surface of at least one of the segmented tooth; defining a facial surface portion including a surface area that is at least partly bound by a virtual boundary that is non-interfacing with the gingiva; generating a modified three-dimensional digital representation using the defined facial surface portion; and generating, based on the modified three-dimensional digital representation, the digital data set configured to be used in fabricating the physical dental bleaching tray.

20 Claims, 4 Drawing Sheets

(56) References Cited

U.S. PATENT DOCUMENTS

| | | | |
|---|---|---|---|
| 10,311,162 B2* | 6/2019 | Fisker | G06F 30/00 |
| 10,568,721 B2* | 2/2020 | Boehm | A61C 13/0013 |
| 10,893,920 B2* | 1/2021 | Fisker | A61C 9/004 |
| 11,185,395 B2* | 11/2021 | Barak | A61C 5/80 |
| 11,273,016 B2* | 3/2022 | Kim | A61C 13/0004 |
| 11,318,000 B2* | 5/2022 | Choi | A61C 13/0004 |
| 11,419,699 B2* | 8/2022 | Salah | A61C 7/08 |
| 11,510,759 B2* | 11/2022 | Fisker | A61C 13/0004 |
| 11,596,499 B2* | 3/2023 | Choi | A61C 7/002 |
| 11,877,901 B2* | 1/2024 | Kohnen | A61C 13/01 |
| 2004/0110110 A1* | 6/2004 | Chishti | B33Y 80/00 433/24 |
| 2007/0292821 A1* | 12/2007 | De Vreese | A61C 13/08 433/195 |
| 2009/0136893 A1 | 5/2009 | Zegarelli | |
| 2009/0311645 A1 | 12/2009 | Matty et al. | |
| 2009/0325127 A1* | 12/2009 | Kusch | A61C 13/0004 700/98 |
| 2012/0244488 A1 | 9/2012 | Chishti et al. | |
| 2013/0209965 A1* | 8/2013 | Fisker | A61C 9/0046 433/220 |
| 2014/0011162 A1* | 1/2014 | Zegarelli | H02K 1/2733 433/215 |
| 2014/0277665 A1* | 9/2014 | Fisker | G06F 30/00 700/98 |
| 2015/0111177 A1* | 4/2015 | Fisker | A61C 9/004 433/199.1 |
| 2015/0182301 A1 | 7/2015 | Hegland | |
| 2018/0098829 A1* | 4/2018 | Fisker | A61C 13/01 |
| 2019/0247174 A1 | 8/2019 | Zegarelli | |
| 2019/0357997 A1 | 11/2019 | Shi et al. | |
| 2020/0015937 A1 | 1/2020 | Stewart | |

OTHER PUBLICATIONS

Kondo et al., "Tooth Segmentation of Dental Study Models Using Range Imgages", IEEE Transactions on Medical Imaging, vol. 23, No. 3, pp. 350-362, Mar. 2004.

Kronfeld et al., "Snak-Based Segmentation of Teeth from Virtual Dental Casts", Computer-Aided Design and Applications, vol. 7, No. 2, pp. 221-233, Jan. 2010.

Kumar et al., "Improved Segmentation of Teeth in Dental Models", Computer-Aided Design and Applications, vol. 8, No. 2, pp. 211-224, Jan. 2011.

Kumar et al., "Automatic Feature Identification in Dental Meshes", Computer-Aided, Design and Applications. vol. 9, No. 6, pp. 747-769, 2012.

Shah et al., "Automatic Tooth Segmentation Using Active Contour Without Edges", Biometrics Symposium, Special Session on Research at the Biometric Consortium Conference, Baltimore, MD, pp. 1-6, Sep. 2006.

Wu et al., "Tooth segmentation on dental meshes using morphologic skeleton", Computers & Graphics 38, pp. 199-211, 2014.

Xu et al., "3D Tooth Segmentation and Labeling Using Deep Convolutional Neural Networks", IEEE Transactions on Visualization and Computer Graphics, vol. 25, No. 7, pp. 2236-2348, Jul. 2019.

* cited by examiner

SYSTEM AND METHOD FOR FABRICATING A DENTAL TRAY

TECHNICAL FIELD

The disclosure relates to a system and method for fabricating a dental tray. In particular, the disclosure relates to a method and system for generating a digital data set for use in fabricating a physical dental bleaching tray. The physical dental bleaching tray may be utilized for delivering agents such as a teeth whitening (bleaching) agent, or medicaments.

BACKGROUND

The desire for whiter teeth is considered to be a necessity in today's cosmetically oriented society. To achieve this goal, people have veneers placed over their teeth or have their teeth chemically bleached. A common method for bleaching involves the use of a dental tray that is custom-fitted to a person's teeth and comfortable to wear. One type of customized tray is made from a stone cast of a person's teeth. Other non-customized (generic) trays that approximate the shapes and sizes of a variety of users' dental arches have also been used. A dental bleaching composition is placed into the tray and the tray placed over the person's teeth for a certain time period. These generic trays do not fit the specific tooth morphology of the individual patients and potentially exposes parts of the patients' soft tissue to the bleaching agent such as Hydrogen Peroxide ($H_2O_2$). The exposure of the chemical to the soft tissue may cause irritation or even burns to the gum.

The generic trays are typically made up of plastic material and in the form of accurate U-shaped mouthpiece with an open-ended interior recess adapted to loosely fit over either of the upper or the lower teeth. As a consequence the tray has a tendency to wobble and slide about in the patient's mouth, thus causing a loss of the bleaching agent, the contamination of the bleaching agent with saliva with which it intermixes in the tray, and a very loose contact of the bleaching agent with the surfaces of the teeth. Such inaccurate sized trays typically provide inaccurate results and limited hygiene. Hence the efficacy of the treatment is somewhat diminished.

In the view of the foregoing, there is need for a method and system for creating an improved dental tray that accurately and securely fits around user's teeth, is much more convenient at a far less expense, and restricts contact between the bleaching agent and oral soft tissue.

SUMMARY

It is to be noted that the following disclosure is described in a relation to one of the two arches, i.e. lower jaw model or upper jaw model. But, the principle and embodiments disclosed herein apply to the another of the two arches. For example, the obtained three-dimensional digital representation represents a digital 3D digital representation of one of the two jaws.

According to an embodiment, a method for generating a digital data set for fabricating a physical dental tray useable to deliver an agent on patient's physical teeth is disclosed. The method includes
  obtaining a three-dimensional digital representation of a patient's dentition comprising teeth and gingiva;
  segmenting two or more of the teeth of the obtained three-dimensional digital representation of the patient's dentition into individual tooth;
  identifying a facial surface of at least one of the segmented tooth;
  defining a facial surface portion comprising a surface area that is at least partly bound by a virtual boundary that is non-interfacing with the gingiva;
  generating a modified three-dimensional digital representation using the defined facial surface portion; and
  generating, based on the modified three-dimensional digital representation, the digital data set configured to be used in fabricating the physical dental tray.

According to an embodiment, a method for fabricating a physical dental bleaching tray useable to deliver a bleaching agent is disclosed. The method includes obtaining a three-dimensional digital representation of a patient's dentition comprising teeth and gingiva;
  segmenting two or more of the teeth of the obtained three-dimensional digital representation of the patient's dentition into individual tooth;
  identifying a facial surface of at least one of the segmented tooth;
  defining a facial surface portion comprising a surface area that is at least partly bound by a virtual boundary that is non-interfacing with the gingiva; and
  fabricating the physical dental bleaching tray comprising at least one cavity for receiving the patient's teeth and at least one receptacle, which is generated based on the surface area, wherein the at least one receptacle is configured to receive a bleaching agent.

In one embodiment the method further comprises generating a modified three-dimensional digital representation using the defined facial surface portion; and generating, based on the modified three-dimensional digital representation, the digital data set configured to be used in fabricating the physical dental bleaching tray.

The bleaching agent is a substance for whitening teeth, such as Hydrogen Peroxide. Other suitable substances known to the person skilled in the art for teeth whitening may also be used.

The physical dental bleaching tray, based on the digital data set, includes a cavity configured to receive patient's teeth and receptacle(s) configured to receive the bleaching agent. Thus, the physical tray is configured to removably fit over the patient's dentition. Utilizing the digital data set that is based on facial surface portion comprising a surface area that is at least partly bound by a virtual boundary that is non-interfacing with the gingiva allows for the fabricated physical tray to securely fit over patient's dentition, where the surface area of the digital data sat is used to define the extent of at least one receptacle across the facial surface of one or more teeth. This is partly possible because of having a section of the physical dental bleaching tray abutting the teeth and extending between the virtual boundary and gingiva and/or edge of the teeth. Thus, even though the receptacle of the physical tray does not interface or overlap with the gingiva, part of the tray itself may extend either until the border between teeth and gingiva or slightly/substantially into the gingiva. This may even be an advantage since it can provide a better fit or better secure the tray on the jaw during use.

The three-dimensional digital representation of a patient's dentition comprising teeth and gingiva may be obtained directly scanning patient's dental arch such as by using an intraoral scanner or by scanning a plaster model of the patient's dental arch. In an embodiment, the patient may have orthodontic appliances such as brackets or clear aligner attachments placed thereon, and scanning the patient's dentition or plaster model may including a representation of such orthodontic appliances. Thus, the method may further include digitally removing the orthodontic appliances, prior to generating the modified three-dimensional digital representation, in order to obtain the three-dimensional digital representation of a patient's dentition comprising teeth and gingiva. In such cases it is a further advantage to ensure that the surface area defined cover the position where the bracket was arranged on the respective tooth. This ensure that any areas around the bracket that has been discolored during bracket placement is subject to whitening/bleaching.

Segmentation generally refers to separation of structures of interest from the background and from one other. The separation results in recognizing the objects such as tooth or gingiva as distinct entities. The segmentation of two or more teeth into individual tooth may be performed automatically or at least partially manually. An example of the segmentation that is performed "at least partially manually" may include automatically segmenting two or more of the teeth into individual tooth, followed by manual validation of the automatic segmentation. The manual segmentation may include one or more of approving the automatic segmentation (e.g. when the user is satisfied with the output of the automatic segmentation) or editing the automatic segmentation based on a manual input (e.g. when the user is dissatisfied with the output of the automatic segmentation). The manual input may include one or more of manually updating the output of the automatic segmentation such as manually updating boundaries between different objects, or recognition of the objects such as tooth numbering. In an embodiment, the segmentation of individual tooth may be achieved by identifying voxels or vertices that belong to the tooth or by locating those that form tooth boundary. The former may be based primarily on the intensity of pixels, but other attributes, such as texture or surface curvature, that may be associated with each pixel/vertex, may also be used for segmentation. Techniques that locate tooth boundary pixels may use the image gradient, which has high values at the edges of objects.

In an embodiment, the segmentation is based on two range images computed from the obtained three-dimensional digital representation as disclosed in Kondo et al. (2004) *Tooth segmentation of dental study models using range images. IEEE Trans Med Imaging.* 23(3):350-62). In another embodiment, the segmentation may be based on morphologic skeleton for scanned dental meshes of the three-dimensional digital representation, as disclosed in Wu et al. (2014) *Tooth segmentation on dental meshes using morphologic skeleton. Computers & Graphics,* 38: 199-211. Other segmentation techniques may be employed such as disclosed in Kronfeld et al. (2010) *Snake-based segmentation of teeth from virtual dental casts, Comp.-Aided Design. and Appl.,* 7(2): 221-233, or in Kumar et al. (2011) *Improved segmentation of teeth in dental models, Comp.-Aided Design. and Appl.,* 8(2): 211-224 or in Xu, Xiaojie et al. "*3D Tooth Segmentation and Labeling Using Deep Convolutional Neural Networks.*" *IEEE Transactions on Visualization and Computer Graphics* 25 (2019): 2336-2348 or in S. Shah et al., "*Automatic Tooth Segmentation Using Active Contour Without Edges,*" 2006 *Biometrics Symposium: Special Session on Research at the Biometric Consortium Conference,* Baltimore, MD, 2006, pp. 1-6. It is apparent that the skilled person may apply other conventionally known segmentation techniques.

The facial surface refers to buccal or labial surface of a tooth. The identification of the facial surface may be performed automatically or at least partially manually. In an embodiment, the user visually identifies the facial surface of the tooth and/or border between the tooth and gingiva. In another embodiment, the identification of the facial surface of the tooth and/or border between the tooth and gingiva may be performed automatically. The identification comprises applying the image processing techniques such as feature detection technique on the obtained 3D digital representation and/or segmented tooth. This may include identifying image features such as lines, edges, corners, ridges, point clouds, corners, point blobs, luminescence, color, surface and so on. Additionally or alternatively, the identification may include comparing the features from the obtained 3D digital representation and/or segmented tooth to a reference data set, which may include a store of 3D digital models or images of same tooth type (e.g. canine, incisor, etc.) or predefined features relating to feature (e.g. border or facial surface) that needs to be identified. Based on the comparison, one or more corresponding features between the compared data sets may be identified. This allows for identifying the feature in the obtained 3D digital representation and/or segmented tooth based on the identified similar corresponding predefined features of the reference data set. In one embodiment, the image processing technique utilizes machine learning techniques. The identification of the feature (e.g. border or facial surface) includes recognizing feature based on a comparison or matching content of the obtained 3D digital representation and/or segmented tooth with feature specific trained data set(s) that may have been created using machine learning techniques such as neural networks. It would be apparent to the skilled person may use conventionally known techniques such as the technique disclosed in Kumar, Yokesh et al. (2013) *Automatic Feature Identification in Dental Meshes. Computer-Aided Design and Applications.* 9. 747-769.

The virtual boundary comprises a curve that runs along and a predefined distance from a section of the perimeter of the tooth, the section of the perimeter represents the border between the tooth and gingiva. The border between the tooth and gingiva may be determined as part of the segmentation step, as described earlier. The virtual boundary may be defined automatically or at least partially manually. In an embodiment, defining a section of the virtual boundary includes identifying a number of offset points positioned on the facial surface of the tooth and away from the border; and generating the section of the virtual boundary by connecting the number of offset points. In another embodiment, automatically defining a section of the virtual boundary includes generating a digital data format that defines the border between the tooth and gingiva; converting the digital data formation into a plurality of points with geometrical information associated with the border; identifying a number of offset points, corresponding to at least two of the plurality of points, positioned on the facial surface of the tooth and away from the border; and generating the section of the virtual boundary by connecting the number of offset points. Typically, an offset point from the number of offset points is closer to at least one of the mid-point of the incisal edge or central groove of the tooth when compared to the position of the corresponding point from the plurality of points. In another embodiment, the user may visually identify the border and identify a number of offset points positioned on the facial surface of the tooth and away from the border; and system may automatically generate the section of the virtual boundary by connecting the number of offset points. In any of the preceding examples, the method may further include updating at least a portion the generated section of the virtual boundary based on a user input. Such input may be provided by way of an editing tool available as part of the user interface. In yet another embodiment, the user may simply draw the section of the virtual boundary using an editing tool.

The facial surface portion includes a part of the, but not the whole, facial surface of the tooth. The term "non-interfacing" refers to devoid of contact. In context of the disclosure, virtual boundary non-interfacing with the gingiva refers to the virtual boundary not in contact with the gingiva. However, the term "non-interfacing" may include the possibility of the virtual boundary abutting the contact points of the adjacent teeth and gingiva, for example within an interproximal embrasure of adjacent teeth.

In an embodiment, generating the modified three-dimensional digital representation using the defined facial surface portion allows for generating a digital data set based on which a physical dental bleaching model is generated such as by direct fabrication techniques like stereolithography. The dental tray may be created by way of thermo-foaming or vacuum-foaming a polymeric sheet over the physical dental bleaching model of the modified three-dimensional digital representation. In another embodiment, generating the modified three-dimensional digital representation using the defined facial surface portion allows for generating a digital data set based on which a physical dental bleaching tray may be directly generated such as by direct fabrication techniques like stereolithography.

In one embodiment, the digital data set includes a digital representation of the dental tray comprising at least one cavity for receiving the patient's teeth and at least one receptacle. The physical dental tray may be formed using the digital data set through direct fabrication techniques. In another embodiment, the digital data set includes a modified representation of the obtained three-dimensional digital representation of a patient's dentition. The modified representation may be used to fabricate a physical dental model such as by direction fabrication. The dental tray model may be formed by thermo-foaming or vacuum-foaming a polymeric sheet over the physical dental model of the modified three-dimensional digital representation.

In an embodiment, the virtual boundary is defined such that the virtual boundary includes a first section and a second section. The first section includes an offset curve away from an interface between the at least one of the segmented tooth and gingiva. The second section includes another offset curve away from tooth edges of the at least one of the segmented tooth. The first section and the second section in combination bound the surface area of the facial surface portion. In other words, the first section and the second section define a closed curve that enclose the surface area of the facial surface portion. The "away from" may be defined by way of an automatically determined distance and/or a distance defined by a user from the gingiva and/or edge respectively. The automatically determined distance may include a predefined minimum distance, or dynamic determination a distance based on geometric configuration of the tooth or tooth with neighboring tooth. The tooth edges may be identified by way of the segmentation step and/or applying the image processing techniques.

In another embodiment, the virtual boundary is defined such that the virtual boundary includes a first section and a second section. The first section includes an offset curve away from an interface between each of more than one of at least two of the segmented tooth and gingiva. The second section includes another offset curve away from collective tooth edges of the more than one of the at least two of the segmented tooth. The first section and the second section in combination bound the surface area of the facial surface portion.

In an embodiment, the virtual boundary is defined such that the virtual boundary includes a first section and a second section. The first section includes an offset curve away from an interface between the at least one of the segmented tooth and gingiva. The second section includes at least one tooth edge of the at least one of the segmented tooth, the at least one tooth edge being non-interfacing with the gingiva. The first section and the second section in combination bound the surface area of the facial surface portion.

In an embodiment, the method further includes identifying occlusal surface of the at least one of the segmented tooth. The occlusal surface includes tooth surface relating to occlusion between teeth of upper jaw and teeth of lower jaw. The techniques disclosed in relation to the identification of the facial surface may also be applied to identify the occlusal surface. For example, the identification comprises applying the image processing techniques such as feature detection technique on the obtained 3D digital representation and/or segmented tooth. The method includes further modifying the generated modified three-dimensional digital representation based on the identified occlusal surface. The digital data set, used for the fabrication of the physical dental tray, may be further based on this further modification. The further modification may be part of the digital data set that was generated earlier and was configured to be used in fabricating the physical dental bleaching tray. The further modification corresponds to a pocket over the occlusal surface. The pocket is configured to receive an agent such as the bleaching agent. This allows the physical dental tray to have the receptacle that additionally extend over the occlusal surface of the at least one of the segmented tooth, wherein the extension over the occlusal surface represents the pocket. The modification may employ techniques disclosed in relation to the facial surface portion. For example, the modification may include increasing height or projected height of at least a part of the occlusal surface. Such increasing may include scaling up and/or adding a height increasing virtual surface.

According to an embodiment, fabricating the physical dental bleaching tray comprising at least one cavity for receiving the patient's teeth and at least one receptacle, which is generated based on the surface area and further modification, wherein the at least one receptacle is configured to receive a bleaching agent. The bleaching tray thus includes a receptacle that extends over at least a part of the facial surface and at least an occlusal surface of the at least one of the tooth of patient's teeth.

In an embodiment, the virtual boundary is defined such that the virtual boundary includes a first section and a second section. The first section includes an offset curve away from an interface between each of more than one of at least two of the segmented tooth and gingiva. The second section includes at least one collective teeth edge of the more than one of at least two of the segmented tooth, the at least one collective teeth edge being non-interfacing with the gingiva. The first section and the second section in combination bound the surface area of the portion.

In any of the embodiments disclosing the offset curve and/or another offset curve, the term "away" is defined as "in immediate vicinity". In other words, the curve is substantially proximate, i.e adjacent and may even be as close as possible but prevented from touching the gingiva and/or edges. The immediate vicinity or substantially proximate may define a specific distance that allows application of agent like bleaching agent to be applied only to enamel of the crown, and not to gingiva and/or exposed dentin such as in case of recessed gum. Thus, the immediate vicinity may be defined by a specific distance from the closest gingiva. The distance is at least 0.1 mm such as in the range of 0.1 mm to 4 mm. For example, in case of no or minor gum recession, the distance may be between 0.1 mm to 1.3 mm, whereas in case of recessed gums, the distance may extend as much as 4 mm. Thus, in an embodiment, the first section comprises the offset curve that is in immediate vicinity of the interface between the at least one of the segmented tooth and gingiva. Additionally, the second section including the another offset curve away from tooth edges of the at least one of the segmented tooth and/or collective tooth edges of the more than one of the at least two of the segmented tooth may be in immediate vicinity of the tooth edges and/or collective tooth edges respectively.

In an embodiment, generating the modified three-dimensional digital representation using the defined facial surface portion comprises increasing height or projected height of at least a part of the facial surface portion. Increasing height of the at least a part of the facial surface portion generates a modified three dimensional digital representation of the patient's dentition such that a surface area of the modified facial surface portion comprising the increased height is more than the surface area of the facial surface portion of the three dimensional digital representation.

In an embodiment, the modified three-dimensional digital representation includes a modified three-dimensional digital representation of a patient's dentition. Increasing the height of the at least a part of the facial surface portion includes scaling up at least a part of the facial surface portion of the three-dimensional digital representation of the patient's dentition.

In an embodiment, the modified three-dimensional digital representation includes a modified three-dimensional digital representation of a patient's dentition. Increasing the height of the at least a part of the facial surface portion includes adding a height increasing virtual surface over at least a part of surface area of the facial surface portion of the three-dimensional digital representation of the patient's dentition. The height increasing virtual surface may include virtual material, where an outer surface of the virtual surface corresponds to, such as matches with, an inner surface of the receptacle of the dental tray.

In an embodiment, the modified three-dimensional digital representation includes a modified three-dimensional digital representation of a patient's dentition. Increasing the height of the at least a part of the facial surface portion includes scaling up the identified facial surface of the at least one of the segmented tooth; and scaling down the scaled up facial surface lying outside the virtual boundary back to the facial surface of the at least one of the segmented tooth.

In an embodiment, the modified three-dimensional digital representation includes a modified three-dimensional digital representation of a patient's dentition. Increasing the height of the at least a part of the facial surface portion includes scaling up the at least one of the segmented tooth; and scaling down a part of the at least one of the segmented tooth lying outside the virtual boundary back to the at least one of the segmented tooth.

In an embodiment, the modified three-dimensional digital representation includes a modified three-dimensional structure defined by a layer. The layer includes a cavity for receiving patient's dentition with a receptacle for receiving an bleaching agent. The three-dimensional layer is formed over the modified three-dimensional digital representation of a patient's dentition having the increased height in at least a part of the surface area of the facial surface portion of the three-dimensional digital representation. The increased height in in at least a part of the surface area of the facial surface portion may be achieved by employing one of the embodiments disclosed in preceding embodiments.

In an embodiment, the modified three-dimensional digital representation includes a three-dimensional digital structure defined by a layer. The layer includes a cavity for receiving patient's dentition with a receptacle for receiving an bleaching agent. This may include forming a part of the three-dimensional layer over the three-dimensional digital representation of a patient's dentition to define the cavity; projecting a plurality of vectors from at least a part of surface of the facial surface portion in a direction away from the at least a part of surface to define the projected height, and generating a surface using height points associated with the projected height to define the receptacle.

In an embodiment, obtaining the three-dimensional digital representation of a patient's dentition comprises digitally removing virtual representation of brackets from received 3D model of patient's teeth prior to generating the modified three-dimensional digital representation.

In an embodiment, fabricating the physical dental bleaching tray includes fabricating, using the digital data set, a physical three-dimensional model of the modified three-dimensional digital representation of a patient's dentition; and thermoforming or vacuum-forming a polymeric sheet material over the physical three-dimensional model to generate the physical dental bleaching tray.

In an embodiment, fabricating the physical dental bleaching tray includes fabricating, using the digital data set, the three-dimensional digital structure using additive manufacturing to generate the physical dental bleaching tray.

In an embodiment, at least one of the segmenting, identifying the facial surface, defining the virtual boundary, generating the modified three-dimensional digital representation, or generating the three-dimensional digital structure is performed automatically.

In an embodiment, at least one of the segmenting, identifying the facial surface, defining the virtual boundary, generating the modified three-dimensional digital representation, or generating the three-dimensional digital structure is performed manually.

In an embodiment, the virtual boundary, at least in part, is manipulable and comprises a plurality of control points. The manipulable virtual boundary may be manually changed using the plurality of control points.

In an embodiment, the height or projected height, at least in part, is manipulable and comprises a plurality of control points. The manipulable height or manipulable projected height may be manually changed using the plurality of control points.

In an embodiment, a tooth shade value for at least a region of facial surface portion may be determined, a desired shade value for the at least a region is selected, a volume of a selected whitening agent required to achieve the desired shade value is determined; and the increased height or increased projected height using the determined volume and virtual boundary is determined.

According to an embodiment, a method for fabricating a physical dental bleaching tray useable to deliver a bleaching agent at patient's teeth is disclosed. The method comprises
    performing an intraoral scan of a patient at a visit of the patient at a dental service site to obtain a three-dimensional digital representation of a patient's dentition;

segmenting two or more of the teeth of the obtained three-dimensional digital representation of the patient's dentition into individual tooth;

identifying a facial surface of at least one of the segmented tooth;

defining a facial surface portion comprising a surface area that is at least partly bound by a virtual boundary that is non-interfacing with the gingiva;

fabricating the physical dental bleaching tray comprising at least one cavity for receiving the patient's teeth and at least one receptacle, which is generated based on the surface area, wherein the at least one receptacle is configured to receive a bleaching agent; and delivering the fabricated physical dental bleaching tray to the patient during the visit.

The dental service site may include at least one of a dentist clinic, an orthodontist clinic, a dental service retail shop such as clear aligner shops (e.g. Smile Shops run by the company SmileDirectClub).

The method may further include determining a tooth shade value of at least a region of facial surface portion of the at least one of the segmented tooth of the obtained three-dimensional digital representation.

According to an embodiment, the method further includes delivering to the patient a first bleaching agent at the visit.

According to an embodiment, the method further includes performing an intraoral scan of a patient at a subsequent visit of the patient at the dental service site to obtain a subsequent three-dimensional digital representation of a patient's dentition;

segmenting two or more of the teeth of the obtained subsequent three-dimensional digital representation of the patient's dentition into individual tooth;

identifying a facial surface of at least one of the segmented tooth of the obtained subsequent three-dimensional digital representation;

determining a tooth shade value of at least a region of the facial surface portion of the at least one of the segmented tooth of the obtained subsequent three-dimensional digital representation;

performing a shade comparison between i) one or more of the tooth shade value of at least a region of the facial surface portion of the at least one of the segmented tooth of the obtained subsequent three-dimensional digital representation and tooth shade value of at least a region of facial surface portion of the corresponding at least one of the segmented tooth of the obtained three-dimensional digital representation; or ii) the tooth shade value of at least a region of the facial surface portion of the at least one of the segmented tooth of the obtained subsequent three-dimensional digital representation and a desired shade value for the at least a region of the facial surface portion.

The method may further include digitally designing, as disclosed earlier, the dental template tray at the subsequent visit based on the shade comparison. Additionally or alternatively, the method includes delivering to the patient a second bleaching agent at the subsequent visit. The second bleaching agent may be a different bleaching agent or the same bleaching agent form the visit but with a different concentration.

According to an embodiment, a data processing system is disclosed. The data processing system includes means such as a hardware processor that are configured to perform one or more steps of the method disclosed in one or more embodiments of this disclosure.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor.

The method may include one or more functions that allow one or more system components to perform one or more steps of the method disclosed in one or more embodiments of this disclosure.

BRIEF DESCRIPTION OF THE DRAWINGS

The embodiments of the disclosure, together with its advantages, may be best understood from the following illustrative and non-limiting detailed description taken in conjunction with the accompanying figures in which.

DETAILED DESCRIPTION

In the following description, reference is made to the accompanying figures, which show by way of illustration how the invention may be practiced.

Figure 1:
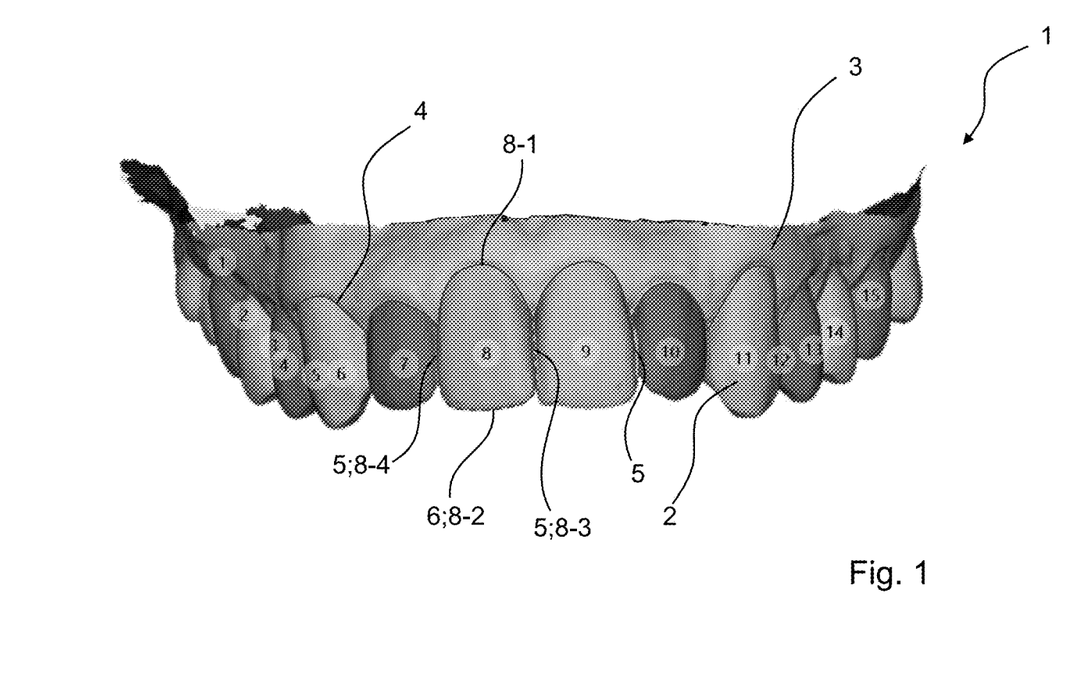
FIG. 1 shows a three-dimensional digital representation of a patients dentition according to an embodiment.

FIG. 1 shows a three dimensional digital representation of a patients dentition in the form of the upper jaw 1, comprising representations of the patients teeth 2 and gingiva 3 in the upper jaw.

The three dimensional representation of the upper jaw 1 is based on a digital scan of the upper jaw. The digital scan can be obtained in different ways, the most common are typically either by directly intra oral scanning the upper jaw or by taking a physical impression of the upper jaw and subsequently provide a cast thereof which is scanned or by inverting a scan of the impression tray.

The digital scan is subsequently processed. Data may be cleaned up and a mesh model is generated that enables the digital scan to be visualized on a monitor.

Furthermore gingiva and teeth are identified in a segmentation process. As shown in FIG. 1 the segmentation has provide a tooth and gingiva boundary line 4 defining the boundary between the gingiva and the teeth. Interproximal edges 5 are furthermore identified. The interproximal edges identifies the respective mesial and distal edges of a tooth and together with the tooth and gingiva boundary line 4 and the incisal edge 6 of each tooth in the upper jaw can be determined from the scan data. As shown each tooth has been segmented and individual tooth numbering has been provided.

Thus, the left incisor 8 has been indexed 8, where all the teeth have a respective index number set by the software as shown. The left incisor 8 is defined by a left incisor boundary line 8-1, which forms part of the tooth and gingiva boundary line 4, its incisal edge 8-2 and respective mesial edge 8-3 and distal edge 8-4 defined by the respective two interproximal edges 5.

In a corresponding manner each tooth 1-15, is defined by a boundary line 1-1, 2-1, 3-1, . . . 13-1, 14-1, 15-1 which each forms part of the tooth and gingiva boundary line 4, its incisal edge 1-2, 2-2, 3-2, . . . 13-2, 14-2, 15-2 its mesial edge 1-3, 2-3, 3-3, . . . 13-3, 14-3, 15-3 and its distal edge 1-4, 2-4, 3-4, . . . 13-4, 14-4, 15-4, respectively.

Figure 2:
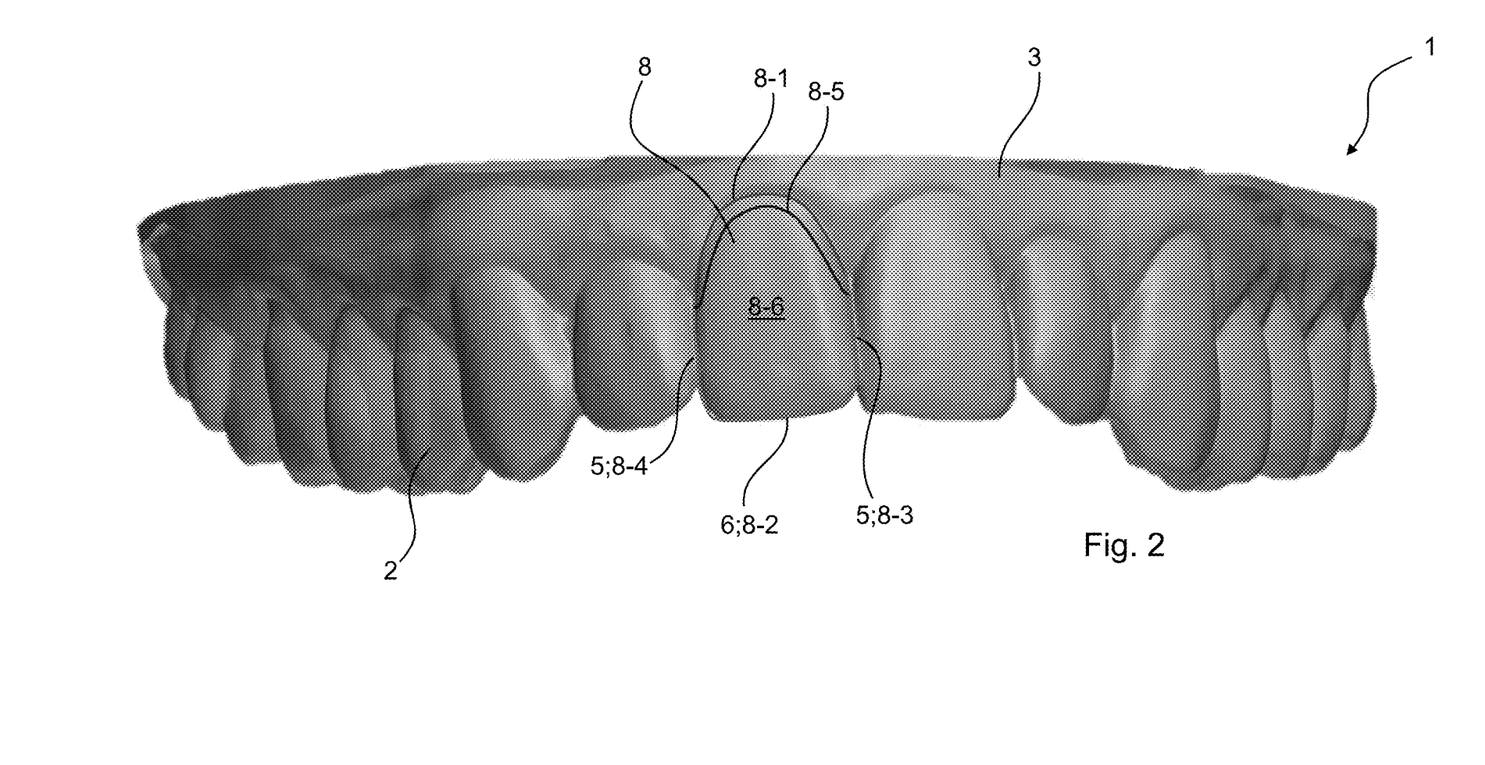
FIG. 2 shows the three-dimensional representation of the upper jaw according to an embodiment.

FIG. 2 shows the three dimensional representation of the upper jaw 1 where further analysis has been provided. Using the left incisor 8 as an example of a virtual boundary 8-5 is defined by offsetting boundary line 8-1 of the left incisor 8 along the tooth surface in a direction away from the gingiva.

Together with the mesial and distal edges 8-3 and 8-4 and the incisal edge 8-2 the virtual boundary 8-5 defines a surface area 8-6 which does not interface or overlap with the gingiva of the upper jaw.

This process of generating a virtual boundary line and defining a surface area 1-6, 2-6, 3-6, . . . 13-6, 14-6, 15-6 is repeated for all teeth subject to treatment.

Figure 3:
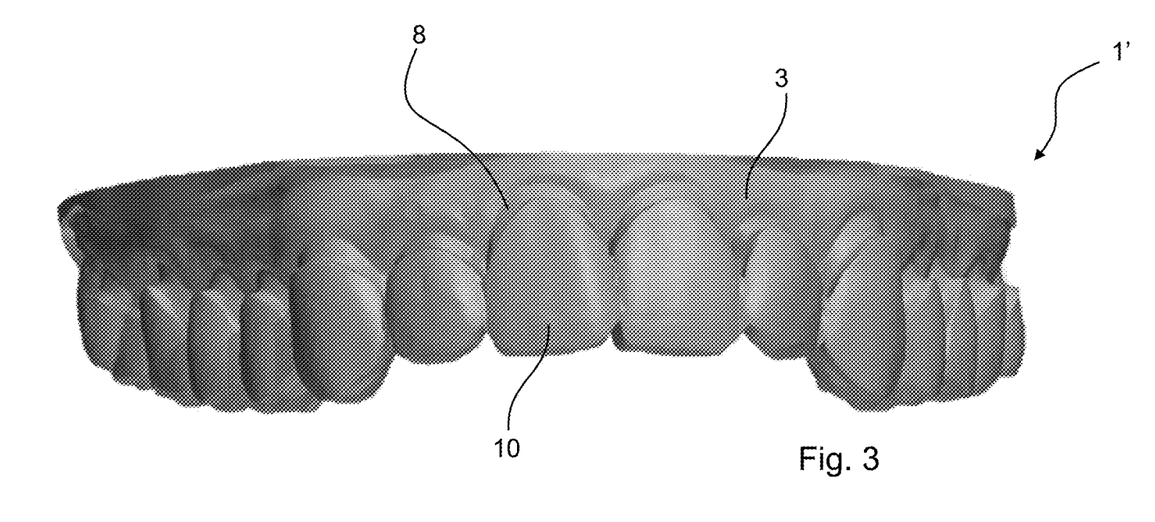
FIG. 3 shows a modified digital representation of an upper jaw.

A modified digital representation of the upper jaw 1' is generated as shown in FIG. 3 where a raised surface area 10 has been generated by virtually raising the defined surface areas 1-6, 2-6, 3-6, . . . 13-6, 14-6, 15-6 defined as described above with respect to FIG. 2 for all the teeth in the upper jaw. The raised surface area 10 can be generated by raising each surface area separately. Alternatively the defined surfaces can also be joined as one surface and subsequently raised as one surface. For the current embodiment one or the other method does not provide any specific advantage, however, in cases where different doses of bleaching agent is needed for separate teeth the final receptacles can have different volumes if the surface areas are raised separately. Alternatively, by raising them together the design process can simplified and designs can be provided faster.

The raised surface area 10 may subsequently be smoothed or otherwise modified in order to remove e.g. undercuts in the physically manufactured bleaching tray.

Figure 4:
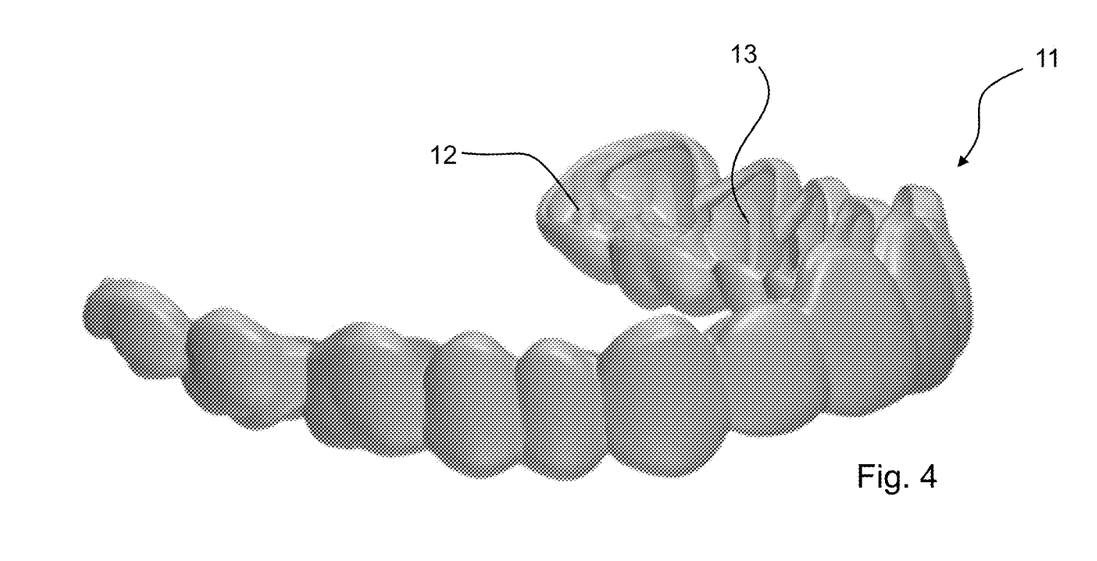
FIG. 4 shows a bleaching tray according to an embodiment.

Based on the modified digital representation of the upper jaw 1' a bleaching tray 11, shown in FIG. 4, can be manufactured. As also described herein at least two different methods are envisioned, however, modifications or alternatives thereto may be provided.

In a first manufacturing method a physical modified dental model is manufactured based directly on the modified digital representation of the upper jaw 1'. Thus a physical dental bleaching model having a raised surface area 10 is provided. The raised surface 10 can be generated by manipulating the surface area 8-6, or it can also be generated by adding a separate model layer by virtual painting on top of the surface area 8-6.

Using traditional thermoforming manufacturing tools a polystyrene or polyvinylchloride (or other suitable material) sheet is pressed down over the dental model whereby a dental tray is generated. Due to the teeth representations on the dental model cavities are provided in the dental model for receiving the teeth and in addition a receptacle for receiving a bleaching agent is generated due to the raised surface area 10 on the tooth surface.

In a second manufacturing method a virtual model of a dental tray is generated based on the modified digital representation of the upper jaw 1' where a raised surface has been generated on the digital representation.

Alternatively the virtual model of the dental tray comprising the cavities and receptacle is based on unmodified three dimensional digital representation of a patients dentition where the receptacle(s) for receiving the bleaching agent without raising the surface area on the digital representation of the teeth but instead the surface area confined by the boundary segments is used to directly form the receptacle digitally in the virtual model of the dental tray.

This can for example be done by transferring/projecting the surface area from the tooth model onto the inside of the virtual model of the dental tray and subsequently offset/displace the wall structure of the dental tray a desired distance in the area defined by the surface area enclosed by the boundary segments.

A physical dental bleaching tray is subsequently manufactured directly based on the virtual model of the dental tray either from a single use mold or by direct 3D printing.

Both methods provides a physical dental tray 11 as shown in FIG. 4 having cavities 12 for receiving the patients teeth and receptacles 13 for receiving the bleaching agent.

Although some embodiments have been described and shown in detail, the disclosure is not restricted to such details, but may also be embodied in other ways within the scope of the subject matter defined in the following claims. In particular, it is to be understood that other embodiments may be utilized and structural and functional modifications may be made without departing from the scope of the present invention. Also, the term virtual is understood as digital and vice versa.

A claim may refer to any of the preceding claims, and "any" is understood to mean "any one or more" of the preceding claims.

It should be emphasized that the term "comprises/comprising/including" when used in this specification is taken to specify the presence of stated features, integers, operations, steps or components but does not preclude the presence or addition of one or more other features, integers, steps, components or groups thereof.

In claims enumerating several means, several of these means can be embodied by one and the same item of hardware. The mere fact that certain measures are recited in mutually different dependent claims or described in different embodiments does not indicate that a combination of these measures cannot be used to advantage.

The invention claimed is:

1. A method for fabricating a physical dental bleaching tray useable to deliver a bleaching agent, comprising
    obtaining a three-dimensional digital representation of a patient's dentition comprising teeth and gingiva;
    segmenting two or more of the teeth into individual tooth;
    identifying a facial surface of at least one of the segmented tooth;
    defining a facial surface portion comprising a surface area that is at least partly bound by a virtual boundary that is non-interfacing with the gingiva;
    fabricating the physical dental bleaching tray comprising at least one cavity for receiving the patient's teeth and at least one receptacle that is generated based on the surface area, wherein the at least one receptacle is configured to receive a bleaching agent;
    generating a modified three-dimensional digital representation using the defined facial surface portion; and
    generating, based on the modified three-dimensional digital representation, a digital data set configured to be used in fabricating the physical dental bleaching tray;
    wherein generating the modified three-dimensional digital representation using the defined facial surface portion comprises increasing height or projected height of at least a part of the facial surface portion.

2. The method according to claim 1, further comprising defining the virtual boundary wherein
    the virtual boundary comprises a first section comprising an offset curve away from an interface between the at least one of the segmented tooth and gingiva, and a second section comprising another offset curve away from tooth edges of the at least one of the segmented tooth, the first section and the second section in combination bound the surface area of the facial surface portion; and/or the virtual boundary comprises a first section comprising an offset curve away from an interface between each of more than one of at least two of the segmented tooth and gingiva, and a second section comprising another offset curve away from collective tooth edges of the more than one of the at least two of the segmented tooth, the first section and the second section in combination bound the surface area of the facial surface portion.

3. The method according to claim 2, wherein the first section comprises the offset curve that is in immediate vicinity of the interface between the at least one of the segmented tooth and gingiva; and/or the second section comprising another offset curve away from tooth edges of the at least one of the segmented tooth and/or collective tooth edges of the more than one of the at least two of the segmented tooth is in immediate vicinity of the tooth edges and/or collective tooth edges respectively.

4. The method according to claim 1, further comprising defining the virtual boundary wherein the virtual boundary comprises a first section defined by an offset curve away from an interface between the at least one of the segmented tooth and gingiva, and a second section comprising at least one tooth edge of the at least one of the segmented tooth, the at least one tooth edge being non-interfacing with the gingiva; and the first section and the second section in combination bound the surface area of the facial surface portion; and/or the virtual boundary comprises a first section defined at least in part by an offset curve away from an interface between each of more than one of at least two of the segmented tooth and gingiva, and a second section comprising at least one collective teeth edge of the more than one of at least two of the segmented tooth, the at least one collective teeth edge being non-interfacing with the gingiva; and the first section and the second section in combination bound the surface area of the portion.

5. The method according to claim 1, wherein the modified three-dimensional digital representation comprises a modified three-dimensional digital representation of a patient's dentition, wherein increasing the height comprises scaling up at least a part of the facial surface portion of the three-dimensional digital representation of the patient's dentition.

6. The method according to claim 1, wherein the modified three-dimensional digital representation comprises a modified three-dimensional digital representation of a patient's dentition, wherein increasing the height comprises adding a height increasing virtual surface over at least a part of surface area of the facial surface portion of the three-dimensional digital representation of the patient's dentition.

7. The method according to claim 1, wherein the modified three-dimensional digital representation comprises a modified three-dimensional structure defined by a layer comprising a cavity for receiving patient's dentition with a receptacle for receiving an bleaching agent, and the method further comprising forming the three-dimensional layer over a modified three-dimensional digital representation of a patient's dentition having the increased height in at least a part of the surface area of the facial surface portion of the three-dimensional digital representation.

8. The method according to claim 1, wherein the modified three-dimensional digital representation comprises a three-dimensional digital structure defined by a layer comprising a cavity for receiving patient's dentition with a receptacle for receiving an bleaching agent, and the method further comprising forming the three-dimensional layer over the three-dimensional digital representation of a patient's dentition to define the cavity;

projecting a plurality of vectors from at least a part of surface of the facial surface portion in a direction away from the at least a part of surface to define the projected height, and generating a surface using height points associated with the projected height to define the receptacle.

9. The method according to claim 1, wherein fabricating the physical dental bleaching tray comprises fabricating, using the digital data set, a physical three-dimensional model of the modified three-dimensional digital representation of a patient's dentition; and thermoforming or vacuum-forming a polymeric sheet material over the physical three-dimensional model to generate the physical dental bleaching tray; or fabricating, using the digital data set, the three-dimensional digital structure using additive manufacturing to generate the physical dental bleaching tray.

10. The method according to claim 1, wherein at least one of the segmenting, identifying the facial surface, defining the virtual boundary, generating the modified three-dimensional digital representation, or generating the three-dimensional digital structure is performed automatically.

11. The method according to claim 1, wherein the virtual boundary, at least in part, is manipulable and comprises a plurality of control points, the method further comprising manually modifying the manipulable virtual boundary using the plurality of control points; and/or the height or projected height, at least in part, is manipulable and comprises a plurality of control points, the method further comprising manually changing the height or projected height using the plurality of control points.

12. The method according to claim 1, further comprises identifying occlusal surface of the at least one of the segmented tooth;

modifying the generated modified three-dimensional digital representation based on the identified occlusal surface, the modification corresponding to a pocket of the physical dental bleaching tray; and fabricating the physical dental bleaching tray to additionally include the pocket.

13. A non-transitory computer readable medium comprising computer readable program code being executable by a hardware data processor which, when the computer readable program code is executed by the hardware data processor, causes the hardware data processor to perform operations comprising:

obtaining a three-dimensional digital representation of a patient's dentition comprising teeth and gingiva;

segmenting two or more of the teeth into individual tooth;

identifying a facial surface of at least one of the segmented tooth;

defining a facial surface portion comprising a surface area that is at least partly bound by a virtual boundary that is non-interfacing with the gingiva;

generating a modified three-dimensional digital representation using the defined facial surface portion, wherein generating the modified three-dimensional digital representation using the defined facial surface portion comprises increasing height or projected height of at least a part of the facial surface portion;

generating, based on the modified three-dimensional digital representation, a digital data set configured to be used in fabricating the physical dental bleaching tray; and generating instructions for fabricating the physical dental bleaching tray comprising at least one cavity for receiving the patient's teeth and at least one receptacle that is generated based on the surface area, wherein the at least one receptacle is configured to receive a bleaching agent.

14. The computer readable medium according to claim 13, further comprising defining the virtual boundary wherein the virtual boundary comprises a first section comprising an offset curve away from an interface between the at least one of the segmented tooth and gingiva, and a second section comprising another offset curve away from tooth edges of the at least one of the segmented tooth, the first section and the second section in combination bound the surface area of the facial surface portion; and/or the virtual boundary comprises a first section comprising an offset curve away from an interface between each of more than one of at least two of the segmented tooth and gingiva, and a second section comprising another offset curve away from collective tooth edges of the more than one of the at least two of the segmented tooth, the first section and the second section in combination bound the surface area of the facial surface portion.

15. The computer readable medium according to claim 13, further comprising defining the virtual boundary wherein the virtual boundary comprises a first section defined by an offset curve away from an interface between the at least one of the segmented tooth and gingiva, and a second section comprising at least one tooth edge of the at least one of the segmented tooth, the at least one tooth edge being non-interfacing with the gingiva; and the first section and the second section in combination bound the surface area of the facial surface portion; and/or the virtual boundary comprises a first section defined at least in part by an offset curve away from an interface between each of more than one of at least two of the segmented tooth and gingiva, and a second section comprising at least one collective teeth edge of the more than one of the at least two of the segmented tooth, the at least one collective teeth edge being non-interfacing with the gingiva; and the first section and the second section in combination bound the surface area of the portion.

16. The computer readable medium according to claim 13, wherein the first section comprises the offset curve that is in immediate vicinity of the interface between the at least one of the segmented tooth and gingiva; and/or the second section comprising another offset curve away from tooth edges of the at least one of the segmented tooth and/or collective tooth edges of the more than one of the at least two of the segmented tooth is in immediate vicinity of the tooth edges and/or collective tooth edges respectively.

17. A data processing system including a hardware data processor configured to perform operations comprising:

obtaining a three-dimensional digital representation of a patient's dentition comprising teeth and gingiva;

segmenting two or more of the teeth into individual tooth;

identifying a facial surface of at least one of the segmented tooth;

defining a facial surface portion comprising a surface area that is at least partly bound by a virtual boundary that is non-interfacing with the gingiva;

generating a modified three-dimensional digital representation using the defined facial surface portion, wherein generating the modified three-dimensional digital representation using the defined facial surface portion comprises increasing height or projected height of at least a part of the facial surface portion;

generating, based on the modified three-dimensional digital representation, a digital data set configured to be used in fabricating the physical dental bleaching tray; and generating instructions for fabricating the physical dental bleaching tray comprising at least one cavity for receiving the patient's teeth and at least one receptacle that is generated based on the surface area, wherein the at least one receptacle is configured to receive a bleaching agent.

18. The system according to claim 17, further comprising defining the virtual boundary wherein the virtual boundary comprises a first section comprising an offset curve away from an interface between the at least one of the segmented tooth and gingiva, and a second section comprising another offset curve away from tooth edges of the at least one of the segmented tooth, the first section and the second section in combination bound the surface area of the facial surface portion; and/or the virtual boundary comprises a first section comprising an offset curve away from an interface between each of more than one of at least two of the segmented tooth and gingiva, and a second section comprising another offset curve away from collective tooth edges of the more than one of the at least two of the segmented tooth, the first section and the second section in combination bound the surface area of the facial surface portion.

19. The system according to claim 17, further comprising defining the virtual boundary wherein the virtual boundary comprises a first section defined by an offset curve away from an interface between the at least one of the segmented tooth and gingiva, and a second section comprising at least one tooth edge of the at least one of the segmented tooth, the at least one tooth edge being non-interfacing with the gingiva; and the first section and the second section in combination bound the surface area of the facial surface portion; and/or the virtual boundary comprises a first section defined at least in part by an offset curve away from an interface between each of more than one of at least two of the segmented tooth and gingiva, and a second section comprising at least one collective teeth edge of the more than one of the at least two of the segmented tooth, the at least one collective teeth edge being non-interfacing with the gingiva; and the first section and the second section in combination bound the surface area of the portion.

20. The system according to claim 17, wherein
the first section comprises the offset curve that is in immediate vicinity of the interface between the at least one of the segmented tooth and gingiva; and/or
the second section comprising another offset curve away from tooth edges of the at least one of the segmented tooth and/or collective tooth edges of the more than one of the at least two of the segmented tooth is in immediate vicinity of the tooth edges and/or collective tooth edges respectively.

* * * * *